US007749373B2

(12) United States Patent
Hansen et al.

(10) Patent No.: US 7,749,373 B2
(45) Date of Patent: Jul. 6, 2010

(54) HYDROCRACKING PROCESS

(75) Inventors: Jens A. Hansen, Holte (DK); Niels Jørgen Blom, Hillerød (DK); John W. Ward, Yorba Linda, CA (US)

(73) Assignee: Haldor Topsoe A/S, Lyngby (DK)

( * ) Notice: Subject to any disclaimer, the term of this patent is extended or adjusted under 35 U.S.C. 154(b) by 212 days.

(21) Appl. No.: 11/792,505

(22) PCT Filed: Dec. 13, 2005

(86) PCT No.: PCT/EP2005/013328

§ 371 (c)(1),
(2), (4) Date: Jun. 7, 2007

(87) PCT Pub. No.: WO2006/063777

PCT Pub. Date: Jun. 22, 2006

(65) Prior Publication Data

US 2008/0128324 A1 Jun. 5, 2008

(30) Foreign Application Priority Data

Dec. 17, 2004 (DK) .............................. 2004 01947

(51) Int. Cl.
*C10G 65/10* (2006.01)

(52) U.S. Cl. .................. 208/59; 208/111.3; 208/111.35

(58) Field of Classification Search .................. 208/49, 208/58, 59, 107, 108, 109, 111.01, 111.3, 208/111.35

See application file for complete search history.

(56) References Cited

U.S. PATENT DOCUMENTS

| | | | |
|---|---|---|---|
| 3,128,924 | A | 4/1964 | Gorman |
| 3,132,087 | A | 5/1964 | Kelley et al |
| 3,159,564 | A | 12/1964 | Kelley et al. |
| 3,293,192 | A | 12/1966 | Maher et al. |
| 3,449,070 | A | 6/1969 | McDaniel et al. |
| 3,655,551 | A | 4/1972 | Hass et al. |
| RE28,341 | E | 2/1975 | Wadlinger et al. |
| 3,923,638 | A | 12/1975 | Bertolacini et al. |
| 3,923,641 | A | 12/1975 | Morrison |
| 3,929,672 | A | 12/1975 | Ward |
| 4,028,227 | A | 6/1977 | Gustafson |
| 4,040,944 | A | 8/1977 | Kelley et al. |
| 4,097,365 | A | 6/1978 | Ward |
| 4,211,634 | A | 7/1980 | Bertolacini et al. |
| 4,401,556 | A | 8/1983 | Bezman et al. |
| 4,419,271 | A | 12/1983 | Ward |
| 4,429,053 | A | 1/1984 | Ward |
| 4,486,296 | A | 12/1984 | Oleck et al. |
| 4,601,993 | A | 7/1986 | Chu et al. |
| 4,612,108 | A | 9/1986 | Angevine et al. |
| 4,676,887 | A | 6/1987 | Fischer et al. |
| 4,812,223 | A | 3/1989 | Hickey, Jr. et al. |
| 4,851,109 | A | 7/1989 | Chen et al. |
| 4,857,169 | A | 8/1989 | Abdo |
| 4,857,171 | A | 8/1989 | Hoek et al. |
| 4,875,991 | A | 10/1989 | Kukes et al. |
| 4,894,142 | A | 1/1990 | Steigleder |
| 4,906,353 | A | 3/1990 | Breckenridge et al. |
| 5,284,573 | A | 2/1994 | LaPierre et al. |
| 5,364,514 | A | 11/1994 | Sanborn et al. |
| 5,831,139 | A | 11/1998 | Schmidt et al. |
| 5,935,414 | A | 8/1999 | Sonnemans et al. |
| 6,620,295 | B2 | 9/2003 | Shannon et al. |

FOREIGN PATENT DOCUMENTS

| | | |
|---|---|---|
| WO | WO 00/69993 | 11/2000 |

OTHER PUBLICATIONS

J. H. Wilson, et al., "SULFICAT®: Off-Site Presulfiding of Hydroprocessing Catalyst from Eurecat," Catalyst 1987, Studies in Surface Science and Catalysts, No. 38, pp. 393-398.

H. Robson (Editor) & K.P. Lillerud, (XRD Patterns), "Verified Synthesis of Zeolitic Materials," Synthesis Commission of the International Zeolite Association, Elsevier 2001.

*Primary Examiner*—Walter D Griffin
*Assistant Examiner*—Renee Robinson
(74) *Attorney, Agent, or Firm*—Dickstein Shapiro LLP

(57) ABSTRACT

A process for hydrocracking a hydrocarbon feedstock comprising components boiling above 343° C. into a middle distillate fraction in the presence of hydrogen under hydrocracking conditions, comprising contacting the hydrocarbon feedstock in a first hydrocracking zone in the presence of one or more hydrocracking catalysts and thereafter in a second hydrocracking zone in the presence of one or more hydrocracking catalysts, and recovering a middle distillate product, wherein the entire effluent from the first hydrocracking zone is passed into the second hydrocracking zone, and at least one hydrocracking catalyst in the first hydrocracking zone comprises one or more hydrogenation components on a support comprising at least one large pore zeolite having a pore diameter in the range of 0.7-1.5 nm and at least one inorganic oxide, and at least one hydrocracking catalyst in the second hydrocracking zone comprises one or more hydrogenation component on a support comprising a beta zeolite and at least one inorganic oxide.

9 Claims, No Drawings

HYDROCRACKING PROCESS

The invention relates to a two-catalyst process for hydrocracking of a hydrocarbon feedstock in the presence of hydrogen under hydrocracking conditions in which at least two distinct hydrocracking zones are operated in series.

BACKGROUND OF INVENTION

Petroleum refiners often produce desirable products, such as gasoline and middle distillates by catalytically hydrocracking high boiling hydrocarbons into product hydrocarbons of lower average molecular weight and boiling point. Hydrocracking is generally accomplished by contacting, in an appropriate reactor vessel, a gas oil or other hydrocarbon feedstock with a suitable hydrocracking catalyst under appropriate conditions. These conditions include elevated temperature and elevated pressure and the presence of hydrogen, such that a hydrocarbon product is obtained containing a substantial portion of a desired product boiling in the range of 85° C. to 215° C. or middle distillate boiling in the range of 150° C. to 425° C.

Usually, hydrocracking is practised in a single reaction vessel or several reaction vessels in series utilising a single catalyst. In such a scenario, the catalyst not only hydrocracks the hydrocarbon feedstock into lower boiling products but simultaneously or sequentially converts the organonitrogen- and organosulphur-containing compounds into ammonia and hydrogen sulphide. Some isomerisation of normal or near normal paraffins can also take place simultaneously. Such an operation is broadly termed a single stage operation.

Hydrocracking can also be performed in conjunction with hydrotreating, usually by a method referred to as "integral operation". In this process, the hydrocarbon feedstock, usually gas oil containing a substantial proportion of components boiling above a desired end point as for example 215° C., is introduced into a catalytic hydrotreating zone in the presence of a suitable catalyst. This catalyst can be a zeolite or sieve-free particulate catalyst comprising a Group VIII metal component and a Group VIB metal component on a porous, inorganic, refractory oxide catalyst support most often composed of alumina. Suitable process conditions include elevated temperature (e.g. 230° C. to 455° C.) and elevated pressure (e.g. 4 to 35 Mpa) and hydrogen as a reactant.

The organonitrogen components and the organosulphur components contained in the feedstock are converted to ammonia and hydrogen sulphide, respectively. Subsequently, the entire effluent is removed from the hydrotreating zone and treated in a hydrocracking zone maintained under suitable conditions of elevated temperature, pressure and hydrogen partial pressure. The hydrocracking zone contains a suitable hydrocracking catalyst, such that a substantial conversion of high boiling feed components to products components boiling below the desired end point is obtained. Usually, the hydrotreating and hydrocracking zones in integral operation are maintained in separate reactor vessels, but, on occasion, it may be advantageous to employ a single, downflow reactor vessel containing an upper bed of hydrotreating catalyst particles and lower bed of hydrocracking particles.

Examples of integral operation may be found in U.S. Pat. Nos. 3,132,087; 3,159,564; 3,655,551 and 4,040,944, all of which are herein incorporated by reference in their entireties. The unconverted product from the hydrocracking bed may or may not be recycled to either of the prior catalysts. Such an operation is also referred to as a single stage process.

When two catalysts in two separate vessels are used, it is often desirable to fractionate (or separate) the products of the first reactor (hydrotreating) so as to remove the produced ammonia, hydrogen sulphide and light hydrocarbons from the feed to the hydrocracking reactor. Examples of such processes are disclosed in U.S. Pat. Nos. 3,923,638 and 4,211,634 incorporated by reference. Such separation can also be made when two similar catalysts are used.

In some integral operation refining processes, and especially those designed to produce middle distillate from the heavier gas oils, a relatively high proportion of the product hydrocarbons obtained from integral operation will have a boiling point above the desired end point. For example, in the production of a middle distillate product boiling in the 180-390° C. range from a gas oil boiling entirely above 300° C., it may often be the case that as much as 30° C. to 60° C. percent by volume of the products obtained from integral operation boils above 390° C. To convert these high boiling components to hydrocarbon components boiling below 390° C., the petroleum refiner separates the 390° C. high boiling components from the other products obtained in integral operation, usually after first removing ammonia by a water washing operation, a hydrogen-containing recycle gas by high pressure separation and an $H_2S$ containing $C_1$ to $C_3$ low BTU gas by low pressure separation. This 390° C. boiling bottom fraction is then subjected to further hydrocracking, either by recycle to the hydrocracking reactor in single stage operation or by introduction into a second hydrocracking zone whereby yet more conversion to the desired 180-390° C. product takes place.

Further description of two-stage hydrocracking operations may be found in U.S. Pat. Nos. 4,429,053 and 4,857,169 herein incorporated by reference in their entireties. These patents provide process flow sheets for typical two-stage hydrocracking processes.

U.S. Pat. No. 4,875,991 discloses a two-zone hydrocracking process in which a feedstock is contacted with a first reaction zone catalyst comprising hydrogenation components essentially of a nickel compound and a tungsten compound deposited on a support consisting essentially of an alumina component and a crystalline molecular sieve component and contacting the effluent from first reaction zone in a second reactor zone with a catalyst comprising a hydrogenation component consisting essentially of a molybdenum component deposited on a support component consisting essentially of an alumina compound and a crystalline molecular sieve component.

An essential disclosure is the superiority of a molybdenum compound catalyst in zone 2. Furthermore, this patent does not teach the use of beta zeolite and in addition does not disclose the benefits of using two different catalysts containing two different molecular sieves in the different zones.

U.S. Pat. No. 4,851,109 discloses a two zone process using a large pore molecular sieve in the first zone and a beta zeolite in the second zone in which the product from the first zone is separated and only the unconverted first zone product is fed to the second hydrocracking zone.

U.S. Pat. No. 5,935,414 discloses a dual catalyst system specifically for a process designed to convert a wax containing feedstock containing a substantial portion of hydrocarbons boiling above 343° C. into middle distillate product with a reduced wax content, which comprises (a) contacting the feed in the presence of hydrogen with a catalyst containing a carrier, hydrogenation components selected from Group VIB and Group VIII and a large pore Y zeolite having a pore diameter in the range of 0.7 to 1.5 nm in a hydrocracking zone and (b) passing the entire effluent into a second zone containing a crystalline, intermediate pore size molecular sieve selected from the group of metallosilicates and silica-alumina phosphates and having a pore diameter in the range of 0.5 to 0.7 nm in a hydrodewaxing zone. Suitable zeolites for use in the first zone include X, Y, L, omega, beta, and their modifications. Suitable zeolites for use in the second zone include SAPO 11, 31, 34, 40, 41, ZSM 5, ZSM 11, −12, −23, −35 and −38, ZSM 5 being preferred. It is seen that zeolite beta is a suitable component for zone 1 but not for zone 2.

WO Patent Application No. 00/69993 discloses a dual catalyst system for hydrocracking heavy naphtha feedstocks into gasoline blending stocks and lighter compounds. According to the text, the feedstock maximum boiling point is about 240° C. It is disclosed that an unexpected increase in selectivity to liquid products is obtained when partial or complete aromatics saturation is achieved prior to hydrocracking. The dual catalyst system used is able to decouple the aromatics saturation and hydrocracking reactions. The feedstock is defined as being a straight run thermally or catalytically cracked naphtha typically boiling below 260° C. The product is usually gasoline blending stock. Compared to a single catalyst system, the yield of $C_1$ to $C_4$ is decreased and yield of $C_5$-260° C. product increased.

The preferred aromatics saturation catalyst consists of a noble metal supported on a Y zeolite operating in a pressure range of 350-1200 psig, and conversions are typically greater than 30 vol %. A highly active zeolite beta with a molar silica-alumina ratio in the range of 10-200 is desirable for use as the hydrocracking catalyst in the process. In the preferred process, the aromatics saturation zone is operated at a lower temperature than the cracking zone.

U.S. Pat. No. 4,906,353 discloses dual mode hydrocracking conversion process. The feedstock is first treated under reforming conditions and then hydrocracked. The process is directed towards producing a relatively low yield of high octane hydrocrackate and a relatively high yield of $C_2$-$C_4$ hydrocarbons.

U.S. Pat. No. 5,831,139 discloses a process combination to upgrade heavy naphtha to aliphatic gasoline.

U.S. Pat. No. 5,364,514 discloses passing a feedstock into one or more hydrocracking zones to effect the decomposition of organic sulphur and nitrogen components. A portion of the product is passed to an aromatics saturation zone and subsequently to a hydrocracking zone wherein the products are separated into a top fraction and a bottom fraction. Part or all of the bottom fraction is recycled to the hydrocracking zone and/or the aromatics saturation zone.

U.S. Pat. No. 6,620,295 B2 discloses a hydrocracking catalyst containing modified Y and zeolite betas contained in the same particles.

Hydrocracking catalyst comprising Y-zeolites are well known in prior art. Examples of prior art of hydrocracking utilizing Y zeolite are given in U.S. Pat. Nos. 4,851,109, 4,875,991 and 4,401,556, which are incorporated by reference. Prior art disclosure of beta zeolite containing hydrocracking catalysts is exemplified by U.S. Pat. No. 3,923,641, U.S. Pat. Nos. 3,128,924, 5,284,573 and 4,612,108, which are incorporated by reference, further illustrate the use of hydrocracking catalysts containing beta zeolite.

None of these patents disclose the use of a first hydrocracking zone containing a large pore zeolite catalyst, preferably a Y-zeolite, followed by a second hydrocracking zone containing a catalyst comprising a beta zeolite, in which the total product of the first zone is passed to the second zone.

Although several types of commercial hydrocracking catalysts exist, which can be used effectively in single stage hydrocracking or in either the first, second or both stages of the above discussed two-stage hydrocracking processes, there is always a demand for catalysts with superior overall activity, selectivity and stability for producing gasoline and/or middle distillate via hydrocracking.

The general object of the present invention is directed towards a novel process employing two different hydrocracking catalysts in two different zones in which the product of the first zone is passed in total to the second zone.

The present invention is particularly directed towards hydrocarbon conversion catalysts, and hydrocarbon conversion processes employing such catalysts comprising a hydrogenation component(s) on a catalyst support comprising a zeolite component.

SUMMARY OF INVENTION

This invention relates to a process for hydrocracking of a hydrocarbon feedstock in the presence of hydrogen under hydrocracking conditions in which at least two distinct hydrocracking zones are operated in series. Specifically, the hydrocarbon feedstock is contacted in a first reaction zone with a first catalyst comprising a Group VIB and/or a Group VIII metal supported on a support comprising a large pore crystalline molecular sieve and an inorganic oxide.

In the process of the invention a portion of the feedstock is converted into products boiling in the middle distillate range. The total effluent from the first reaction zone is passed into a second hydrocracking zone and further hydrocracked in the presence of hydrogen over a catalyst comprising Group VIB and/or Group VIII metal components supported on a support consisting of a beta zeolite and at least one inorganic oxide to produce a high yield of middle distillate.

The process of the invention has been found to produce higher yields of middle distillates and/or superior pour point middle distillates than disclosed in prior art.

FIELD OF INVENTION

This invention relates to the refining of petroleum hydrocarbons into products of greater utility and higher value as compared to the feedstock. The process of the invention converts high boiling petroleum feedstocks into lower boiling products in particular middle distillates. The process enables a higher yield of high quality middle distillate products to be obtained with lower pour point than obtainable under comparable conditions and known in prior art.

The invention comprises a process for hydrocracking a hydrocarbon feedstock having the characteristics described in claim 1.

DETAILED DESCRIPTION OF INVENTION

The present invention is directed towards an improved hydrocracking process in which a heavy hydrocarbon feed is hydrocracked first under hydrocracking conditions in a first hydrocracking zone on a catalyst utilizing a hydrogenation component supported on a large pore zeolite containing support. The total effluent from the first hydrocracking zone is further hydrocracked in a second hydrocracking zone on a catalyst utilizing a hydrogenation component supported on a beta zeolite containing support.

The two hydrocracking zones may be in the form of stacked beds in one reactor or the zones may be in two separate reactor vessels. Each zone may consist of one or more hydrocracking catalyst beds.

The feedstocks which are employed in the present process may be generally characterized as high boiling point feeds of petroleum origin although feeds of other origin may also be employed, for example, feeds from synthetic oil production processes such as Fischer-Tropsch synthesis or other synthetic processes such as shale oil and tar sands. In general, the feeds will have a relatively high boiling point usually above about 205° C. or higher, for example, above 230° C., and in most cases above about 315° C. with many having an initial boiling point of above about 343° C. The boiling characteristics, especially the end point, of the feed will be determined by the products required.

If lubricants are to be produced in significant quantity, the feed itself must contain significant quantities of components in the lubricant boiling range, usually above 343° C. Thus, when lubricant production is desired, the feed will generally be a gas oil, i.e. a high boiling distillate feed with an end point typically of about 565° C. Typical feeds, which may be processed, include gas oils such as coker heavy gas oil, vacuum gas oils, reduced crudes and atmospheric gas oils. Cycle oils from catalytic cracking processes typically have a boiling range of about 205° C. to 400° C. although light cycle oils may have a lower end point e.g. 315° C. or 343° C. Heavy cycle oils may have a higher initial boiling point (IBP) e.g. about 260° C. The relatively high aromatic content of the cycle oils renders them extremely suitable for processing in the initial hydrocracking step of the present integrated process sequence. In addition, the decreasing level of demand for such refractory stocks at the present makes them extremely attractive materials for processing in the inventive process.

In the process of the invention, the above disclosed feedstock is hydrocracked over two distinct hydrocracking catalysts in two separate hydrocracking zones in series in which the effluent of the first zone is passed in total into the second hydrocracking zone.

Before being introduced into the first hydrocracking zone, the feedstock is usually hydrotreated in an initial zone containing a typical hydrotreating catalyst consisting of Group VIB and VIII metal components supported on an alumina support as discussed above. In this hydrotreating zone, the organic nitrogen and sulphur compounds are converted by hydrogenation into ammonia and hydrogen sulphide. These gases may be passed into the first hydrocracking zone along with the hydrocracking feedstock or separated out with other light products.

The hydrocracking feedstock can optionally be catalytically treated by an amorphous type hydrocracking catalyst that is non-zeolitic and based on amorphous silica-alumina such as Zeolyst™ Z-603 or UOP DHC-8, before entering the first hydrocracking zone. This can be done in order to further treat the feedstock.

The feedstock is then passed with hydrogen into the first hydrocracking zone in which the feedstock is partially converted into a product boiling below about 390° C. In this zone, the aromatic components in the feedstock are preferentially converted (although not completely) into middle distillate and lower boiling components. In this zone, at least 30 volume %, preferentially 45 volume %, and most preferred at least 60 volume % of the feedstock to the first cracking zone is converted into middle distillate and lower boiling product, all boiling below about 390° C.

In this zone, the aromatic compounds in the feedstock are preferably hydrogenated, partially cracked and converted into lower boiling products. The aromatics are preferably converted into paraffins and other saturates, which, however, undergo substantial conversion themselves.

The total product including gaseous products from the reaction zone is passed without separation into the second reaction zone in which further conversion occurs. In this zone, the paraffins and other saturates are preferably converted into lower boiling products. Simultaneously or sequentially the paraffins and other high pour point hydrocarbons are isomerized into lower pour point hydrocarbons.

The result of the process of the invention is to produce a high yield of high quality middle distillate, higher than that resulting from a single zone process. The middle distillate usually has a very desirable lower pour point. In order to achieve these results, the catalysts utilized in the zones are specifically formulated.

Suitable hydrocracking catalysts for the first hydrocracking zone comprise Group VIB and/or Group VIII non noble metal components supported on a high surface area inorganic oxide support. Suitable Group VIII metal components also include platinum and palladium components, preferably oxide and sulphide. Suitable Group VIB components include molybdenum and tungsten oxides and sulphides with tungsten compounds being preferred.

The metal compounds are supported on a high surface area inorganic oxide support. A key component of the support is a large pore molecular sieve such as X, Y, L, ZSM 20 and omega zeolite with Y zeolite being preferred. Although not essential, it is preferred that the catalyst used in zone 1 is devoid of beta zeolite.

Modified, hydrothermally stabilized and ultra-stable Y-zeolites are highly preferred.

The preferred molecular sieve can be modified by ion exchanging to remove alkali ions with hydrogen ions or hydrogen ion precursors such as ammonium ions. Suitable alkali ion contents are less than 1.0 weight %, preferably less than 0.5 weight %.

The desired molecular sieve can also be ion exchanged and/or hydrothermally treated and/or acid washed to increase the molar silica to alumina ratio. Preferred silica to alumina mole ratios are at least 10 and preferably at least 25. Silica to alumina mole ratios of 30 and higher are most preferred.

The catalyst support can also comprise at least one inorganic oxide. Suitable inorganic oxides include alumina, silica, titanium, zirconia and their binary and tertiary combinations especially silica-alumina, silica-titania, silica-zirconia-titania. The support may optionally also contain an inorganic oxide binder. A particularly suitable binder is alumina especially when peptized with an acid. A most preferred binder alumina is a pseudo boehmite alumina Catapal® currently available from the Sasol North America Inc.

The Y-zeolite and amorphous component required in the catalyst and catalyst support suitable for use in the process of the invention are embodied into particles which contain both components. Convenient methods for physically integrating the two components into individual particulates include comulling a wetted mixture of the components and then extruding the comulled material through a die having small openings therein of desired cross-sectional size and shape, e.g. circle, trilobal clover leaf, quadrolobal clover leafs, etc., breaking or cutting the extruded matter into appropriate lengths, drying the extrudates and then calcining at a temperature, e.g. 480° C. or higher. A material is produced that is suitable for use in high temperature chemical conversion reactions, and the material has e.g. trilobal or quadrolobal shapes, as shown for example in FIGS. 8 and 10, respectively, in U.S. Pat. No. 4,028,227 herein incorporated by reference in its entirety.

The amorphous components may be oxides of silica-alumina. Other amorphous components useful in the process of the invention are silica, alumina, titania, zirconia, chromia and their binary and ternary combinations.

Typically, the amorphous oxides besides contributing to the catalytic properties of the catalyst support also serve as binders for the modified zeolites. Alumina and other conventional amorphous, inorganic refractory oxide binder components may be desired.

Regardless of whether an amorphous, inorganic refractory oxide component is used as a binder material to hold the beta zeolite, Y-zeolite, amorphous oxides and other suitable components together in the catalyst support, other such components can also be incorporated into the comulled mixture including for example, inorganic refractory oxide diluents, which may or may not possess some type of catalyst activity. Examples of such diluents include clays, alumina, silica-alumina and a heterogeneous dispersion of finely divided silica-alumina particles in an alumina matrix, the dispersion of which is described in detail in U.S. Pat. Nos. 4,097,365, 4,419,271 and 4,857,171, the disclosures of which are herein incorporated by reference in their entireties. Additionally and alternatively, hydrogenation component precursors can also be comulled into the mixture, as will be discussed in more detail hereinafter.

The Y-zeolites used in the process of the invention usually have the original cations associated therewith replaced by a wide variety of other cations according to techniques well known in the art. Typical replacing cations would include hydrogen, ammonium and metal cations such as rare earths, including mixtures of the same. Of the replacing cations, particular preference is given to cations of ammonium and hydrogen.

Typical ion exchange techniques would be to contact the particular zeolite with a solution of a salt of the desired replacing cation or cations. Although a wide variety of salts can be employed, particular preference is given to chlorides, nitrates and sulphates.

A zeolite which may be used is the ultra-stable Y-zeolite. The ultra-stable zeolites disclosed herein are well known to those skilled in the art. For example, they are described at pages 507-522 and pages 527 and 528 of the book Zeolite Molecular Sieves by Donald W. Breck, John Wiley & Sons, Inc. 1974 and are exemplified in U.S. Pat. Nos. 3,293,192 and 3,449,070. These two patents and the reference to Breck above are incorporated herein by reference. The low soda, ultra stable zeolites are available commercially from W.R. Grace & Company, Zeolyst International and Tosoh Corporation among others. Many other zeolites obtained by modifying the hydrothermal treatment and ion exchange of Y zeolites are now available. Such materials are envisioned as potential components of the catalyst and are disclosed in detail in U.S. Pat. Nos. 3,929,672, 4,401,556, and 4,894,142 which patents are incorporated by reference.

The Y-zeolites for the first zone catalyst have pore diameters in the range of 0.7 to 1.5 nm. The preferred Y zeolite for use in the first zone catalyst is a modified zeolite having a unit cell constant in the range 24.26 to 24.30 Å.

It may be desirable to incorporate the zeolites into a material resistant to the temperatures and other conditions employed in the process. Such matrix materials include synthetic and naturally occurring substances such as inorganic materials, e.g. clay, silica and metal oxides. The latter may be either naturally occurring or in the form of gelatinous precipitates or gels including mixtures of silica and metal oxides. Naturally occurring clays can be composited with the zeolites including those of the montmorillonite and kaolin families. The clays can be used in the raw state as originally mined or initially subjected to calcination, acid treatment or chemical modification.

The Y-zeolite useful in the process of the invention should have a molar $SiO_2$ to $Al_2O_3$ ratio of at least 5 and preferably at least 10 and more preferably at least 25 and most preferably at least 30.

The catalyst employed in the first hydrocracking zone should preferably be devoid of beta zeolite. Likewise the catalyst employed in the second hydrocracking zone should preferably be devoid of Y-zeolite.

At least one hydrocracking catalyst can be present in each hydrocracking zone. The catalysts employed in the first hydrocracking zone can therefore be based on the large pore zeolite having a pore diameter in the range of 0.7-1.5 nm. Conventional hydrocracking catalysts can also be present.

The catalysts employed in the second hydrocracking zone are based on the beta zeolite.

Suitable amounts of zeolite on a dry basis contained in the catalyst support are less than 50 wt % preferably less than 30 wt % and more preferably less than 15 wt % of the modified Y zeolite with at least 50 wt %, preferably 100 wt % of the balance being amorphous inorganic oxide diluent and binder in combination.

The catalyst employed in the second hydrocracking zone contains a beta zeolite. Typically, the beta zeolite is highly modified from the synthesized form.

Beta zeolite is a crystalline zeolite whose composition and X-ray powder diffraction analysis are disclosed in U.S. Pat. No. Reissue 28,341. This beta zeolite is a zeolite having a molar silica to alumina ratio of 25-30 and a constraint index below 2, preferably between 0.6 and 1.0.

Beta zeolite is prepared, in general, as an aluminosilicate zeolite having a $SiO_2$ to $Al_2O_3$ molar ratio of at least 10. The beta zeolites have a crystal size of about 0.1 to 5 micron, a surface area of about 400 to 800 $m^2/g$, a cyclohexane adsorption capacity above 15 g/100 g, a water vapour sorptive capacity at 25° C. and at a $p/p_o$ value of 0.10, of more than 5 weight percent. As used herein "$p/p_o$" represents the water vapour partial pressure to which the beta zeolite is exposed divided by the water vapour partial pressure at 25° C.

Preparation of beta zeolite has been disclosed in U.S. Pat. Reissue No. 28,341 incorporated by reference in its entirety. Standard preparation of beta zeolite having a $SiO_2$ to $Al_2O_3$ molar ratio of 25-30 has been described in the $2^{nd}$ revised edition of "Verified Syntheses of Zeolitic Materials" by H. Robson (Editor) and K. P. Lillerud (XRD Patterns), Elsevier 2001, which is herein incorporated by reference in its entirety. Zeolite beta can be obtained commercially from companies like Tosoh Corporation, Zeolyst International or Süd-Chemie AG.

As initially prepared, beta zeolite is usually in the alkali metal form and contains an organic templating agent. In this form, the zeolite has a low if any catalytic activity for promoting acid catalysed conversion reactions, e.g. cracking reactions. Accordingly, the zeolite is generally converted to more active forms by calcination to decompose and drive off the templating agent followed by base exchange with ammonium cations to substantially reduce the alklai metal content. This is finally followed by another calcination to convert the ammonium-exchanged zeolite to the hydrogen form. For beta zeolite initially prepared in the sodium form, the preferred sodium content upon conversion to an active form is below 1.0 percent by anhydrous weight, preferably below about 0.5 percent by anhydrous weight, calculated as $Na_2O$. The desired molecular sieve can also be modified by ion exchange and/or hydrothermal treatment and/or acid washing to increase the molar silica to alumina ratio.

Publications which further discuss the properties of zeolite beta include U.S. Pat. Nos. 3,923,641, 4,676,887, 4,812,223, 4,486,296, 4,601,993 and 4,612,108, all of which are herein incorporated by reference in their entireties. The beta zeolites have a molar silica-alumina ratio of at least 25, more preferably at least 100 and most preferably at least 250.

For use in hydroprocessing, such as hydrocracking, the catalyst contains one or more hydrogenation components containing metals selected from the group consisting of Group VIB and/or Group VIII of the periodic table of elements, such components typically being in the form of the free metals or their respective oxides and sulphides, the latter two being most preferred. As used herein, "Periodic Table of Elements" refers to the version found on the inside front cover of the "Handbook of Chemistry and Physics", $59^{th}$ Edition, published in 1979 by the Chemical Rubber Company. The platinum group (or noble) metals of the Group VIII metals may be used, but the preference is at present for the base (or non-noble) metals, e.g. nickel and cobalt in particular, and nickel most preferably of all. Of the Group VIB metals, molybdenum and tungsten are preferred, with molybdenum being most preferred when the catalyst is to be used in gasoline hydrocracking, and tungsten being most preferred when the catalyst is to be used in middle distillate hydrocracking. The most highly preferred catalyst contains both a non-noble Group VIII metal component and a Group VIB metal component, most preferably nickel and molybdenum or nickel and tungsten in combination.

The hydrocracking catalysts useful in the process of the invention contain at least 0.2 wt % of the hydrogenation components calculated as the metals. If noble metals are used, the hydrogenation components are generally present in a relatively low proportion, e.g. 0.2 to 2 wt %. For the base or non-noble metals, the proportions are generally higher. Non-noble Group VIII metal components are typically employed in proportions between about 2 wt % and 15 wt %, preferably between 3 wt % and 10 wt %, calculated as the respective monoxide. The Group VIB metal component is generally employed in proportions of about 5 wt % to 35 wt %, preferably in the range of 8 wt % to 30 wt %, calculated as the respective trioxide. It is to be understood that the proportions given above for the hydrogenation metal components are based on the finished catalyst, whereas the proportions expressed above for the modified zeolite beta or modified zeolite Y particulates are values in the absence of the hydrogenation metal component, i.e. for the catalyst support only. For purposes herein, the term "catalyst support" is defined as all materials in the catalyst except the hydrogenation metal components.

The hydrogenation components may be incorporated into the catalyst in any of many ways known in the art of combining hydrogenation components with catalyst supports containing zeolites. One such method is first to prepare the catalyst support, for example, as an extrudate containing zeolite beta or zeolite Y, and an amorphous inorganic refractory oxide in calcined form and then impregnating the catalyst support with solutions containing the desired metal(s) in dissolved form. Calcination in air, typically in the absence of added steam at an elevated temperature, e.g. above 425° C., preferably above 475° C., produces the desired catalyst containing metals in oxide form.

Likewise, in another embodiment, the desired metal(s) are introduced by comulling a compound containing such metal(s) in the zeolite mixture previously described followed by shaping (e.g. extrusion through a die), drying and calcining in the substantial absence of steam, e.g. at a temperature between about 425° and 550° C. to produce the oxide form of the catalyst. For one preferred catalyst, the comulling is effected with ammonium heptamolybdate as the source of molybdenum and nickel nitrate as the source of nickel with both compounds generally being introduced into the mulling mixture in the form of an aqueous solution. Other metals can be similarly introduced in dissolved aqueous form, likewise non-metallic elements, e.g. phosphorus.

The preferred catalyst will comprise nickel and tungsten compounds supported on the zeolite inorganic oxide support with or without binder.

Catalysts, which contain hydrogenation components in the oxide form as described above, are generally treated to convert the metals to the sulphide form prior to the use of the catalysts in hydrocracking. This can be accomplished by presulphiding the catalyst prior to use at an elevated temperature, e.g. 150° C. to 375° C. with for example a mixture consisting of 10 volume percent $H_2S$ and 90 volume percent $H_2$. Alternatively, the catalyst can be presulphided ex situ by various sulphiding processes. As an illustration, see "Sulficat®: Offiste Presulphiding of Hydroprocessing Catalysts from Eurocat" by J. H. Wilson and G. Berrebi, Catalysts 87, Studies in Surface Science and Catalysts No. 38, page 393. Alternatively, the sulphiding is accomplished in situ, i.e. by using the catalyst in the oxide form to hydrocrack a hydrocarbon feedstock containing sulphur compounds under hydrocracking conditions including elevated temperature and pressure and the presence of hydrogen.

Hydrocracking catalysts suitable for use in the process of the invention are useful in the conversion of a wide variety of hydrocarbon feedstock to a hydrocarbon product of lower average boiling point and/or molecular weight. The feedstocks which may be subjected to hydrocracking by the process of the invention include all mineral oils and synthetic oils (e.g. shale oil, tar sands products, etc.) and fractions thereof. Illustrative feedstocks include straight run gas oils, vacuum gas oils, coker gas oils and catcracker distillates. The typical hydrocracking feedstock, however, contains a substantial proportion of components usually at least 50% by volume, often at least 75% by volume boiling above the desired end point of the products, which end point, in the case of gasoline, will generally be in the range of about 190° C. to 215° C., and in the case of middle distillates will typically be in the range of 340° C. to 425° C. Usually, the feedstock will also contain gas oil components boiling above 285° C. with highly useful results being achievable with feeds containing at least 30% by volume of components boiling between 315° C. and 600° C.

For best results in hydrocracking, the catalyst will be employed as a fixed bed of catalytic particulates in a hydrocracking reactor vessel into which hydrogen and the feedstock are introduced and passed in a downwardly direction. Operating conditions in the reactor vessel are chosen so as to convert the feedstock into the desired product, which in one preferred embodiment, is middle distillates boiling in the 150° C. to 390° C. range. Conditions must be adjusted according to the product (or distribution of products) desired. The unconverted oil, e.g. hydrocarbons boiling at a temperature higher than that of the middle distillate fraction may be used for production of lube oil blending stocks, fluid cracker feedstocks or ethylene cracker feedstock.

The exact conditions required in a given situation will depend upon the nature of the feedstock, the particular catalyst composition utilised and the desired product (s). In general, the conditions of operation for hydrocracking will fall into the following conventional and preferred ranges for single stage operation shown in Table 1.

TABLE 1

| Conditions | Conventional | Preferred |
|---|---|---|
| Temperature, ° C. | 230-455 | 260-430 |
| Pressure, Mpa | 4-30 | 5-20 |
| LHSV, $h^{-1}$ | 0.3-5.0 | 0.5-3.5 |
| $H_2$/feedstock, $Nm^3/m^3$ | 200-2000 | 500-1500 |

As mentioned before, the primary difference in conditions in the two hydrocracking reactor vessels of two stage operation is the presence of substantial amounts of ammonia often greater than about 2000 vol ppm in the first stage and its essential absence, i.e. less than 200 vol ppm, and preferably less than about 20 vol ppm in the second stage, allowing for less severe conditions in the second stage. There may, however, be yet other differences in conditions in any particular situation.

It is preferable that at least 60 volume % of the feedstock is converted into a middle distillate and lower boiling product before entering the second hydrocracking zone.

It is also preferable that at least 35 volume % of the feedstock is converted into middle distillate and lighter products in the first hydrocracking zone.

Based on the presently available data, the catalyst system based on a large pore zeolite and a beta zeolite is useful in the process of the invention, when compared with a single catalyst zone containing similar Y-zeolite, and it is found to be substantially more active for middle distillate production producing low aromatic content product. The distillate products of hydrocracking with the catalyst system also exhibit superior pour point characteristics and higher yields are obtained than disclosed in the prior art. These achievements and others are illustrated in the following examples.

EXAMPLES

The hydrocarbon feedstock to be hydrocracked under hydrocracking conditions into a middle distillate fraction can be first hydrotreated to convert nitrogen and sulphur compounds into ammonia and hydrogen sulphide in the presence of a hydrotreating catalyst. These gases may then be passed into the hydrocracking zone along with the feedstock to be hydrocracked or they may be separated out with other light products. The hydrotreated feedstock is then hydrocracked in a first hydrocracking zone in the presence of a first hydrocracking catalyst, and the total effluent from this first zone is transferred to a second hydrocracking zone for further hydrocracking in the presence of a second hydrocracking catalyst.

Prior to use, all the catalysts were sulphided.

Preparation of Catalyst A for the First Hydrocracking Zone:

A catalyst support was prepared by mixing 10 wt % of a large pore Y-zeolite (obtained from Tosoh Corporation), 35 wt % silica-alumina (75/25 wt % silica/alumina), 35 wt % gamma alumina and 20 wt % peptized alumina (Catapal®). The Y-zeolite had a molar $SiO_2$ to $Al_2O_3$ ratio of 30, a $Na_2O$ content of 0.08 wt %, a pore diameter of 0.74 nm and a unit cell constant $A_0$ of 24.29 Å.

The mixture was extruded through a 1/16" diameter cylindrical die, dried and calcined at 550° C. in air for two hours. The calcined extrudates were impregnated with an aqueous solution containing nickel nitrate and ammonium metatungstate. The wet extrudates were dried and calcined for two hours at 550° C. The final catalyst contained 6 wt % nickel oxide and 22 wt % tungsten oxide.

Preparation of Catalyst B for the Second Hydrocracking Zone:

A catalyst support was prepared by mixing 3 wt % beta zeolite (obtained from Zeolyst International), 77 wt % silica-alumina (75/25 wt % silica/alumina), and 20 wt % peptized alumina (Catapal®). The beta zeolite had a molar $SiO_2$ to $Al_2O_3$ ratio of 300, a surface area of 620 $m^2/g$ and a $Na_2O$ content of 0.05 wt %.

The mixture was extruded, dried, calcined and impregnated with metals as with Catalyst A. After calcination, catalyst B contained 6 wt % nickel oxide and 22 wt % tungsten oxide.

Example 1

A catalyst system consisting of catalysts A and B (abbreviated to cat A and cat B) was evaluated for hydrocracking of a vacuum gas oil feedstock to middle distillate in a test unit with two reactors, a hydrotreating reactor in series with a hydrocracking reactor. Properties of the vacuum gas oil feedstock are given in Table 2.

The first reactor was loaded with a commercial Haldor Topsøe A/S nickel molybdate alumina hydrotreating catalyst (abbreviated to HTAS cat). The second reactor was loaded with the hydrocracking catalyst system. Catalyst A was loaded in the first hydrocracking zone and catalyst B in the second hydrocracking zone.

The operating conditions, conversion and yields, measured relative to the fresh feed, are shown in Table 3.

Example 2

Comparative

The first hydrotreating reactor was loaded with a commercial Haldor Topsøe A/S nickel molybdate alumina hydrotreating catalyst (abbreviated to HTAS cat) as in Example 1. The second reactor was loaded with hydrocracking catalyst A only. The vacuum gas oil feedstock with the properties shown in Table 2 was hydrocracked as in Example 1.

TABLE 2

| Crude type | Iranian Heavy |
|---|---|
| SG (D 4052) | 0.9209 |
| S, wt % (D 4294) | 2.039 |
| N, wt ppm: | |
| Total (D 4629) | 1315 |
| Basic | 549 |
| Aromatics, wt % (IP 391): | |
| Mono | 16.03 |
| Di | 8.62 |
| Tri+ | 12.49 |
| Aniline point, ° C. (D 611) | 81.6 |
| Pour point, ° C. (D 5949) | 39 |
| Distillation, ° C. (D 1160) | |
| Initial boiling point (IBP) | 291 |
| 5 vol % | 347 |
| 10 vol % | 363 |
| 30 vol % | 396 |
| 50 vol % | 430 |
| 70 vol % | 462 |
| 90 vol % | 509 |
| 95 vol % | 528 |
| Final boiling point (FBP) | 549 |

The operating conditions and results are shown in Table 3.

TABLE 3

| | Example 1 | Example 2 |
|---|---|---|
| Catalyst Loading | | |
| Reactor 1: Hydrotreating catalyst (HTAS cat) | 32 ml | 32 ml |
| Reactor 2: Catalyst system | 75 ml Cat A 25 ml Cat B | 100 ml Cat A |
| Feed flow, ml/h | 100 | 100 |
| Reactor pressure, barg | 156 | 156 |
| $H_2$ to oil ratio, Nl/l | 1206 | 1206 |
| Reactor temperature, ° C. | | |
| Reactor 1 | 398.9 | 399.8 |
| Reactor 2 | 401.4 | 405.4 |
| Conversion, vol % (rel. to fresh feed) | 87.2 | 87.2 |
| Yields, vol % (rel. to fresh feed) | | |
| 85-180° C. | 25.48 | 29.80 |
| 180-275° C. | 33.41 | 33.42 |
| 275-390° C. | 29.78 | 26.44 |

A comparison of the results in Table 3 shows that the catalyst system at the same level of conversion (87.2 vol % calculated from the formula 100-[Volume yield of >390° C.]) is about 4° C. more active than the single zone catalyst system. Kinetically, the temperature difference translates into about 30% greater activity. As is well known, an increased activity can be taken advantage of in numerous ways, e.g. longer cycle length or greater conversion both favourable in an industrial application.

A comparison of the data in Table 3 shows that the diesel yield (275-390° C.) is 3.3 vol % higher with the catalyst system. Simultaneously, the yield of heavy naphtha (85-180° C.) is 4.4 vol % lower with the catalyst system. This yield shift is extremely significant for the commercial market, where the growth in the demand for middle distillates exceeds that for naphtha.

A comparison of the properties of the products from the two examples shows that the catalyst system using the exemplified catalysts A and B produces a diesel fraction with significantly lower pour point as shown in Table 4. The pour point of the diesel fraction is reduced from −4 to −15° C. The lowering of the pour point is a distinctive improvement as such and furthermore allows the endpoint of the diesel fraction, if not limited, to be increased significantly. Also significant in the current environmental scenario is the enhanced production of lower sulphur diesel.

The comparative examples illustrate the enhancement of the catalyst system in comparison to single zone operation in producing a significantly larger amount of higher quality middle distillates. The yield of the jet fuel are unchanged, and the smoke point and sulphur content are essentially identical.

TABLE 4

| | Example 1 | Example 2 | Example 1 | Example 2 |
|---|---|---|---|---|
| Product cut | 180-275° C. Jet cut | | 275-390° C. Diesel cut | |
| Sulphur, wt ppm | 3 | 3.8 | 3 | 4.5 |
| Smoke point, mm | 28 | 30 | | |
| Cetane index, D 976 | | | 64 | 66 |
| Pour point, ° C. | | | −15 | −4 |

The invention claimed is:

1. A process for hydrocracking a hydrocarbon feedstock comprising components boiling above 343° C. into a middle distillate fraction in the presence of hydrogen under hydrocracking conditions, the process comprising:

contacting the hydrocarbon feedstock in a first hydrocracking zone in the presence of one or more hydrocracking catalysts and thereafter in a second hydrocracking zone in the presence of one or more hydrocracking catalysts; and recovering a middle distillate product, wherein the entire effluent from the first hydrocracking zone is passed into the second hydrocracking zone, and at least one hydrocracking catalyst in the first hydrocracking zone comprises one or more hydrogenation components on a support comprising at least one large pore zeolite having a pore diameter in the range of 0.7-1.5 nm and at least one inorganic oxide, and at least one hydrocracking catalyst in the second hydrocracking zone comprises one or more hydrogenation components selected from sulphides of Group VIB and VIII elements of the Periodic Table on a support comprising a beta zeolite and at least one inorganic oxide.

2. Process according to claim 1, wherein the hydrogenation components are chosen from the group of nickel and tungsten sulphides and mixtures thereof.

3. Process according to claim 1, wherein the large pore zeolite is Y-zeolite.

4. Process according to claim 3, wherein the Y-zeolite is hydrothermally stabilised Y-zeolite, ultrastable Y-zeolite or Y-zeolite modified by ion exchange.

5. Process of claim 3, wherein the Y-zeolite has a molar silica to alumina ratio greater than 10.

6. Process according to claim 1, wherein the beta zeolite has a molar silica to alumina ratio greater than 25.

7. Process according to claim 1, wherein the beta zeolite has a molar silica to alumina ratio greater than 250.

8. Process according to claim 1, wherein the volume ratio of the first hydrocracking catalyst to the second hydrocracking catalyst is in the range of 80:20 to 20:80.

9. Process according to claim 3, wherein the Y-zeolite has a unit cell constant of less than 24.35 Å.

* * * * *